United States Patent
Iwakuni et al.

(10) Patent No.: US 7,341,975 B2
(45) Date of Patent: Mar. 11, 2008

(54) EXHAUST GAS PURIFICATION CATALYTIC MATERIAL AND METHOD FOR FABRICATING THE SAME

(75) Inventors: Hideharu Iwakuni, Hiroshima (JP); Masaaki Akamine, Hiroshima (JP); Seiji Miyoshi, Hiroshima (JP); Hiroshi Yamada, Hiroshima (JP); Akihide Takami, Hiroshima (JP); Yuki Murakami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 253 days.

(21) Appl. No.: 10/985,773

(22) Filed: Nov. 10, 2004

(65) Prior Publication Data

US 2005/0119120 A1    Jun. 2, 2005

(30) Foreign Application Priority Data

Dec. 1, 2003    (JP)    ............................. 2003-401182

(51) Int. Cl.
*B01J 23/40* (2006.01)
*B01J 23/42* (2006.01)
*B01J 23/44* (2006.01)
*B01J 23/00* (2006.01)

(52) U.S. Cl. ..................... 502/326; 502/304; 502/333; 502/334; 502/339; 502/349

(58) Field of Classification Search ............... 502/304, 502/326, 333, 334, 339, 349
See application file for complete search history.

(56) References Cited

U.S. PATENT DOCUMENTS

| | | | |
|---|---|---|---|
| 4,504,598 A * | 3/1985 | Ono et al. ................... 502/303 |
| 4,923,842 A * | 5/1990 | Summers ..................... 502/261 |
| 5,571,763 A * | 11/1996 | Takemoto et al. ........... 502/334 |
| 5,677,258 A * | 10/1997 | Kurokawa et al. .......... 502/303 |
| 5,795,840 A * | 8/1998 | Takami et al. ............... 502/327 |
| 5,895,772 A * | 4/1999 | Grigorova et al. ........... 502/304 |
| 6,083,467 A | 7/2000 | Takeshima et al. |
| 6,150,288 A | 11/2000 | Suzuki et al. |
| 6,294,140 B1 * | 9/2001 | Mussmann et al. ....... 423/213.5 |
| 6,335,305 B1 * | 1/2002 | Suzuki et al. ................ 502/325 |
| 6,348,430 B1 * | 2/2002 | Lindner et al. .............. 502/304 |
| 6,420,306 B2 * | 7/2002 | Kurokawa et al. .......... 502/261 |
| 6,645,439 B2 * | 11/2003 | Zhang et al. ................. 422/177 |
| 6,800,225 B1 * | 10/2004 | Hagmann et al. .......... 264/1.36 |
| 6,956,008 B2 * | 10/2005 | Takeshima et al. ......... 502/326 |
| 2001/0022956 A1 * | 9/2001 | Okamoto et al. ........ 423/213.5 |
| 2003/0216254 A1 * | 11/2003 | Takeshima et al. ......... 502/304 |
| 2005/0070428 A1 * | 3/2005 | Kawamoto et al. ......... 502/332 |
| 2005/0266986 A1 * | 12/2005 | Tanaka et al. ............... 502/326 |

FOREIGN PATENT DOCUMENTS

| | | |
|---|---|---|
| EP | 0 834 348 A2 | 4/1998 |
| JP | 10-182155 | 7/1998 |
| JP | 10-216517 | 8/1998 |
| JP | 2000-300989 | 10/2000 |

* cited by examiner

Primary Examiner—Cam N. Nguyen
(74) Attorney, Agent, or Firm—Brooks Kushman P.C.

(57) ABSTRACT

The present invention relates to an exhaust gas purification catalytic material containing: (a) a mixed oxide containing Ce and Zr for storing and releasing oxygen; and (b) a precious metal catalyst made of one or more kinds of precious metals. The precious metal catalyst comprises a first precious metal catalyst component placed between atoms, at crystal lattice points and/or at oxygen defect sites of the mixed oxide and a second precious metal catalyst component loaded on the surface of the mixed oxide, thereby improving the thermal resistance, oxygen storage capacity and exhaust gas conversion performance of the catalytic material.

6 Claims, 10 Drawing Sheets

FIG. 1A

- ⊘ First precious metal
- ⊘ Second precious metal
- ○ Ce atom
- ⊘ O atom (lattice point)
- ○ O vacancy

FIG. 1B

- ⊘ precious metal
- ○ Ce atom
- ⊘ O atom (lattice point)
- ○ O vacancy

EXHAUST GAS PURIFICATION CATALYTIC MATERIAL AND METHOD FOR FABRICATING THE SAME

CROSS-REFERENCES TO RELATED APPLICATIONS

This application claims priority under 35 USC 119 to Japanese Patent Application No. 2003-401182, the entire contents of which are incorporated herein by reference.

BACKGROUND OF THE INVENTION (a) Field of the Invention

This invention relates to exhaust gas purification catalytic materials and methods for fabricating the same.

(b) Description of Related Art

Catalytic materials are generally formed so that a precious metal catalyst component is loaded on a support material or materials by impregnation or other processes. For example, three-way catalytic converters for purifying automotive exhaust gas emissions are formed by coating a substrate with alumina and ceria serving as support materials to form a washcoat layer, impregnating the washcoat layer with Pt, Pd, Rh or other precious metals and then calcining the washcoat layer. Ceria acts, in a three-way catalyst, as an oxygen storage component to expand the range of engine air-to-fuel (A/F) ratios within which the catalyst can act effectively. However, ceria has a problem of ineffectiveness in improvement of catalyst thermal resistance.

More specifically, in recent years, in order to effectively purify HC and other components in exhaust gas even at engine start or at low outside temperatures, catalytic converters have been placed closer to the engine to early raise their temperature. Therefore, and also because of increased engine power output, catalysts have more frequently been exposed to high temperatures. However, ceria itself has a poor thermal resistance, which allows sintering of a precious metal catalyst component to early deteriorate the catalyst. Though a simple solution to this problem is to increase the amount of precious metal catalyst component, it leads to increased catalyst cost.

As another solution to the above problem, Japanese Unexamined Patent Publication No. 10-182155 discloses a technique in which alumina-ceria-zirconia mixed oxide having oxygen storage capacity is used as a support material for a precious metal catalyst component to improve the catalyst thermal resistance. The mixed oxide is obtained by preparing an acidic solution containing Ce, Zr and Al ions, pouring this acidic solution and aqueous ammonia concurrently onto a rotating disc to evenly mix both the liquids within one second and thereby produce a mixed oxide precursor, and subjecting the precursor to drying and calcination.

Alternatively, Japanese Unexamined Patent Publication No. 2000-300989 discloses a catalytic material (oxide) containing Ce, Zr and a precious metal catalyst component. This catalytic material is obtained by adding aqueous ammonia to a mixture of cerium nitrate solution, zirconium nitrate solution and precious metal solution (e.g., palladium nitrate solution), filtering a precipitate obtained by coprecipitation, subjecting the precipitate to rinsing and drying, and then calcining it.

In the former technique, when the mixing of the acidic solution and aqueous ammonia is completed in a short time, the dispersivity of metal components is increased to improve the oxygen storage capacity of the resultant mixed oxide, but there is an inevitable limit to such improvement in oxygen storage capacity. Therefore, in order to improve the catalyst performance, it is necessary to load a relatively large amount of precious metal catalyst component on the mixed oxide.

In the latter technique of obtaining a catalytic material (oxide) containing Ce, Zr and a precious metal catalyst component by coprecipitation, aqueous ammonia is dropped into the mixed acidic solution. As a result, the precipitate is separated into early and later precipitated substances and thus does not become a homogeneous precipitate. Therefore, according to this technique, it is difficult to improve the performance of the resultant catalytic material.

SUMMARY OF THE INVENTION

An object of the present invention is to provide a catalytic material with excellent thermal resistance and catalytic performance not by increasing the total amount of precious metal catalyst, but rather while reducing it as compared with the prior-art techniques.

To attain the above object, in a catalytic material of the present invention, a mixed oxide containing Ce and Zr is used as an oxygen storage material, a precious metal is loaded on the mixed oxide surface, and the mixed oxide is doped with the same or another kind of precious metal (i.e., the precious metal is placed between atoms, at crystal lattice points and/or at oxygen defect sites of the mixed oxide), so that the doped precious metal can improve the thermal resistance of the mixed oxide and enhance the oxygen storage capacity to improve the catalytic activity. Thus, the resultant catalytic material can obtain a desired catalytic performance with a small amount of precious metal.

More specifically, in one aspect, the present invention is directed to an exhaust gas purification catalytic material containing: (a) a mixed oxide containing Ce and Zr for storing and releasing oxygen; and (b) a precious metal catalyst made of one or more kinds of precious metals, wherein the precious metal catalyst comprises a first precious metal catalyst component placed between atoms, at crystal lattice points and/or at oxygen defect sites of the mixed oxide to constitute the mixed oxide, and a second precious metal catalyst component loaded on the surface of the mixed oxide.

With this catalytic material, the first precious metal catalyst component placed between atoms, at crystal lattice points and/or at oxygen defect sites of the mixed oxide quickly raises the rate of oxygen storage of the mixed oxide, increases its peak rate and also increases the amount of oxygen storage. The reason for this is believed to be that while oxygen contacting the mixed oxide is taken in the form of ions into oxygen defect sites inside of the mixed oxide, the first precious metal catalyst component existing inside of the mixed oxide expedites the movement of oxygen ions from the mixed oxide surface to the inside.

The detailed behavior of the catalytic material can be explained as follows: The first precious metal catalyst component inside of the mixed oxide acts to take in oxygen ions from the mixed oxide surface, so that the oxygen ions can readily move to low oxygen concentration sites (oxygen defect sites) located in the vicinity of the first precious metal catalyst component inside of the mixed oxide. Furthermore, since the first precious metal catalyst component exists in dispersed form in the mixed oxide, oxygen ions move the inside of the mixed oxide while "hopping", so to speak, from one atom to another of the first precious metal catalyst component. Therefore, the efficiency of utilization of oxygen defect sites inside of the mixed oxide is increased, the rate of oxygen storage is quickly raised, its peak rate is increased, and the amount of oxygen storage is also increased.

When the oxygen storage/release capacity of the mixed oxide is improved by the action of the first precious metal catalyst component as described above, this enhances the activity of the second precious metal catalyst component loaded on the mixed oxide surface. To be specific, the catalytic light-off performance can be improved, the catalytic conversion performance at high temperatures can be enhanced, and the oxidation-reduction reaction of exhaust gas progresses efficiently over a wide exhaust gas temperature range from low to high. Therefore, even when the total amount of first and second precious metal catalyst components is 0.5 mass % or less, or even approximately 0.25 mass %, of the catalytic material, high exhaust gas conversion efficiencies can be implemented.

Furthermore, according to the first aspect of the present invention, when the engine A/F ratio varies or when the engine A/F ratio is changed to store/release oxygen into/from the oxygen storage material in order to allow the exhaust gas purification catalyst to act effectively, the oxygen storage/release response of the oxygen storage material to changes in the A/F ratio can be enhanced and the amount of oxygen storage/release can be increased, which is advantageous in improving the efficiency of exhaust gas conversion.

Since the first precious metal catalyst component is placed between atoms, at crystal lattice points and/or at oxygen defect sites of Ce—Zr mixed oxide as described above, it is strongly bonded to the mixed oxide and therefore less likely to be sintered even when exposed to high temperatures. Furthermore, the mixed oxide itself is suppressed from being sintered by the action of the first precious metal catalyst component incorporated in the mixed oxide, which effectively acts for improvement in the thermal resistance of the catalyst.

The first precious metal catalyst component is preferably Rh. In this case, the oxygen storage/release capacity of the mixed oxide is greatly improved.

When the first precious metal catalyst component is Rh, the second precious metal catalyst component preferably comprises at least one of Rh, Pt and Pd.

In this respect, when the first and second precious metal catalyst components are both Rh, as compared with the case of simply loading Rh on the mixed oxide surface, the catalytic light-off performance and high-temperature catalytic conversion performance are improved in terms of conversion of HC (hydrocarbon), CO (carbon monoxide) and NOx (nitrogen oxides), though the total amount of precious metal is the same.

When the first and second precious metal catalyst components are Rh and Pt, respectively, as compared with the case of simply loading Pt on the mixed oxide surface, the catalytic light-off performance for HC and CO conversion and the high-temperature catalytic conversion efficiencies for HC, CO and NOx are enhanced, though the total amount of precious metals is the same.

When the first and second precious metal catalyst components are Rh and Pd, respectively, as compared with the case of simply placing Rh as the first precious metal catalyst component inside the mixed oxide, the catalytic light-off performance and high-temperature catalytic conversion performance are improved in terms of HC and CO conversion, though the total amount of precious metals is the same.

The second precious metal catalyst component may be used in a combination of two selected from among Rh, Pt and Pd, or may comprise all these three elements loaded on the mixed oxide surface.

The amount of the first precious metal catalyst component is preferably 10 mass % to 80 mass % both inclusive, more preferably 25 mass % to 75 mass % both inclusive of the total amount of the first and second precious metal catalyst components. If the ratio of the first precious metal catalyst component is decreased below the above lower limit, the effect of the first precious metal catalyst component in improving the oxygen storage/release capacity of the mixed oxide is weakened so that a dramatic improvement of the exhaust gas conversion performance cannot be expected any more. On the other hand, if the ratio of the first precious metal catalyst component is increased over the above upper limit, the amount of the second precious metal catalyst component loaded on the mixed oxide surface is relatively small to deteriorate the contact effect of the catalyst, which is disadvantageous to exhaust gas purification.

In another aspect, the present invention is directed to a method for fabricating an exhaust gas purification catalytic material containing (a) a mixed oxide containing Ce and Zr for storing and releasing oxygen, and (b) a precious metal catalyst made of one or more kinds of precious metals, the method comprising the steps of:

preparing an acidic solution containing Ce ions, Zr ions, Nd ions and ions of a first precious metal catalyst component constituting the precious metal catalyst;

completing mixing of the acidic solution with aqueous ammonia within two minutes from the start of the mixing, thereby coprecipitating Ce, Zr, Nd and the first precious metal catalyst component as hydroxide;

calcining the resultant precipitate to obtain a mixed oxide containing Ce, Zr, Nd and the first precious metal catalyst component;

loading the resultant mixed oxide with a second precious metal catalyst component constituting the precious metal catalyst; and calcining the mixed oxide loaded with the second precious metal catalyst component.

According to this method, the catalytic material explained above can be obtained. Furthermore, since the mixing of the acidic solution with aqueous ammonia is quickly carried out, the resultant precipitate is obtained with the metal components relatively evenly mixed, which is advantageous to improvement of the catalytic material performance. In particular, since the dispersivity of the first precious metal catalyst component in the mixed oxide is increased, the oxygen storage/release capacity of the mixed oxide can be enhanced while the amount of the first precious metal catalyst component is saved.

Furthermore, according to the above method, a mixed oxide can be obtained in which the rate of oxygen storage (number of moles of absorbed oxygen atoms per gram of sample per second) in a period from 0.4 seconds to 1.0 second after the start of oxygen storage in an oxygen enriched atmosphere at 500° C. is 120 μmol-O/sec-gram or more, and a mixed oxide can be obtained in which the peak value of the above rate of oxygen storage is 140 μmol-O/sec-gram or more. This improves the activity of the second precious metal catalyst component post-loaded on the mixed oxide surface.

In addition, since the dispersivity of the first precious metal catalyst component in the mixed oxide is increased as described above, this is advantageous in suppressing sintering of the first precious metal catalyst component and also the mixed oxide when the catalytic material is exposed to high temperatures. Since the mixed oxide contains Nd, this is particularly advantageous to improvement in low-temperature activity and thermal resistance of the catalytic material.

Quick mixing of the acidic solution with aqueous ammonia can be implemented, for example, by adding aqueous ammonia to the acidic solution while stirring the acidic solution hard. In this case, aqueous ammonia is preferably added at a stroke to the acidic solution and the mixing is preferably completed within, for example, several seconds. Alternatively, the acidic solution and aqueous ammonia may be quickly mixed by supplying them concurrently to a rotating cup-shaped mixer. The mixing is preferably completed within one second.

DESCRIPTION OF THE PREFERRED EMBODIMENTS

Structure and Behavior of Catalytic Material

Figure 1A:
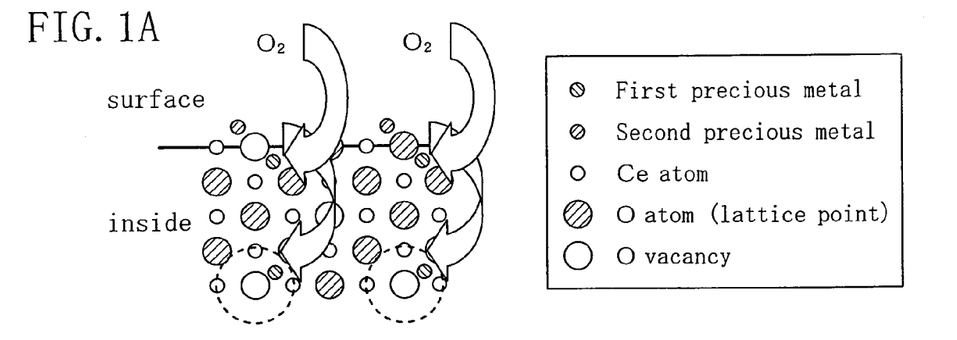
FIG. 1A schematically shows the structure of a catalytic material according to the present invention and its oxygen storage mechanism, and FIG. 1B schematically shows the structure of a catalytic material according to a conventional example and its oxygen storage mechanism.
Figure 1B:
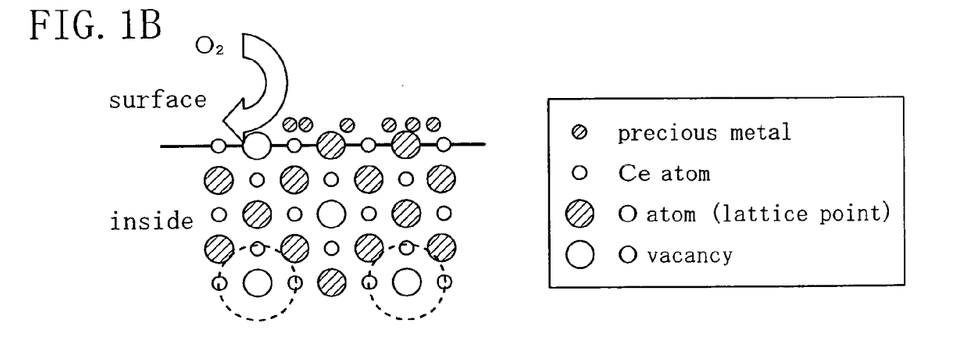

FIG. 1A schematically shows the structure of a catalytic material according to the present invention. This catalytic material is formed so that a first precious metal catalyst component is placed in the form of atoms between atoms, at crystal lattice points and/or at oxygen defect sites of a mixed oxide containing Ce and Zr, and a second precious metal catalyst component is loaded on the surface of the mixed oxide particle. FIG. 1B shows an example of a conventional catalytic material, in which a precious metal catalyst component (corresponding to the above second precious metal catalyst component) is loaded on the surface of a mixed oxide containing Ce and Zr. In FIG. 1, neither Zr nor Nd, which are added if necessary, are given.

For the conventional catalytic material shown in FIG. 1B, the following phenomenon can be explained. Oxygen ($O_2$) is adsorbed as oxygen ions on oxygen defect sites (O vacancies) existing inside of and in the vicinity of the surface of the mixed oxide, but cannot reach oxygen defect sites existing relatively deep inside of the mixed oxide. Therefore, the deep oxygen defect sites are hardly used for oxygen storage.

In contrast, the behavior of the inventive catalytic material shown in FIG. 1A is believed as follows. Oxygen ($O_2$) instantaneously moves as oxygen ions via atoms of the first precious metal catalyst component existing in the mixed oxide to oxygen defect sites inside of the mixed oxide. Furthermore, since the first precious metal catalyst component exists in dispersed form in the mixed oxide, the oxygen ions move from the mixed oxide surface to the oxygen defect sites deep inside of the mixed oxide via the plurality of atoms of the first precious metal catalyst component while "hopping" from one atom to another. Therefore, with the catalytic material of the present invention, the rate of oxygen storage is quickly elevated on entry into oxygen enriched atmosphere and the peak value of the rate of oxygen storage is also elevated. Furthermore, the oxygen defect sites relatively deep inside of the oxygen storage material are used for oxygen storage. As a result, the amount of oxygen storage can be increased.

In this manner, the oxygen storage/release capacity of the mixed oxide can be increased by the action of the first precious metal catalyst component. As a result, the activity of the second precious metal catalyst component loaded on the mixed oxide surface can be enhanced, which improves the light-off performance and high-temperature catalytic conversion performance of the catalytic material.

Furthermore, since the first precious metal catalyst component exists between atoms, at crystal lattice points and/or at oxygen defect sites of the mixed oxide and is therefore strongly bonded to the mixed oxide, it is less likely to be sintered when exposed to high temperatures and the mixed oxide itself is suppressed from being sintered by the action of the first precious metal catalyst component.

Catalytic Material Fabrication Method

Figure 2:
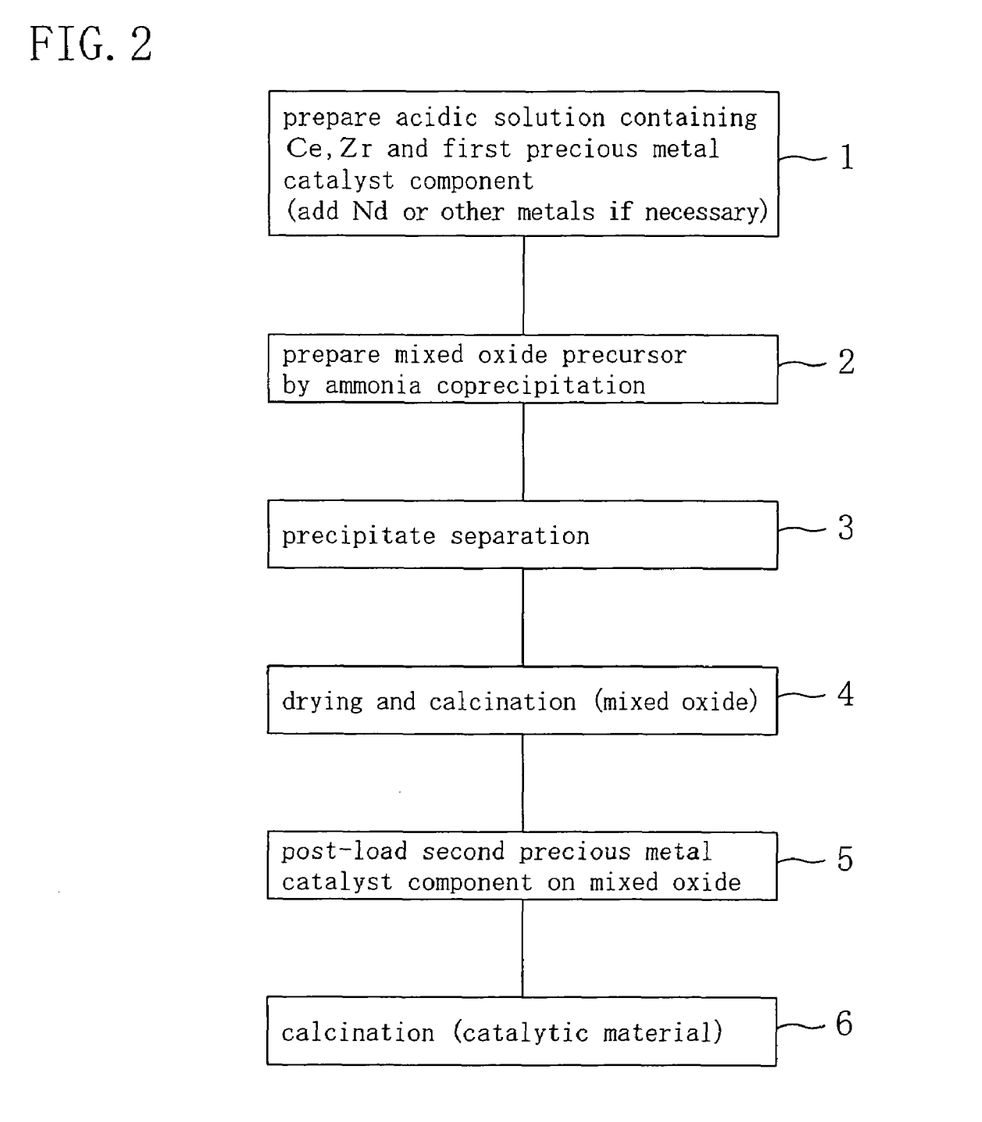
FIG. 2 is a block diagram showing process steps for fabricating a catalytic material according to the present invention.

FIG. 2 illustrates a method for fabricating a catalytic material according to the present invention in the sequence in which its process steps occur. The reference numeral 1 denotes an acidic solution preparation step, in which an acidic solution containing Ce, Zr and a first precious metal catalyst component is prepared. For example, the acidic solution is prepared by mixing solutions of nitrate salts of the above metals. If necessary, any number of salts of other metals such as Nd may be contained in the acidic solution.

The reference numeral 2 denotes a step for preparing a mixed oxide precursor by ammonia coprecipitation. In this step, the acidic solution is mixed with an excessive amount of aqueous ammonia by quickly adding the aqueous ammonia to the solution while stirring the solution, or the acidic solution is quickly mixed with aqueous ammonia by simultaneously supplying the solution and aqueous ammonia to a rotating cup-shaped mixer. As a result, all metals of starting materials are precipitated as metal hydroxide to obtain an amorphous precursor.

In a precipitate separation step identified by the reference numeral 3, the liquid after coprecipitation is allowed to stand for a day and night, the supernatant liquid is removed therefrom to obtain a cake, and the cake is subjected to centrifugation and rinsed in water.

In a drying and calcination step identified by the reference numeral 4, the water-rinsed cake is dried by heating it at approximately 150° C., and the dried cake is then calcined by heating to obtain a mixed oxide. For example, this calcination may be implemented by keeping the cake in a normal atmosphere and, for example, at 400° C. for five hours, and then keeping it at 500° C. for two hours.

The reference numeral 5 denotes a post-loading step in which the resultant mixed oxide is loaded with a second precious metal catalyst component. This post-loading may be implemented by an evaporation-to-dryness method in which a solution of the second precious metal catalyst component (e.g., a nitrate salt solution) is added to the mixed oxide and the solvent is evaporated by heating, or by an impregnation method in which the mixed oxide is impregnated with the solution and then heated.

The reference numeral 6 denotes a step for calcining by heating the mixed oxide loaded with the second precious metal catalyst component to obtain a desired catalytic material. This step is implemented, for example, by keeping the mixed oxide in a normal atmosphere at 500° C. for two hours.

Influence of First Precious Metal Catalyst Component on Mixed Oxide Structure

Preparation or Rh-doped Mixed Oxide

Respective predetermined amounts of zirconium oxynitrate solution, cerous nitrate solution, neodymium (III) nitrate hydrate solution and rhodium nitrate solution were mixed with water to make a total volume of 300 mL of mixed solution, and the mixed solution was stirred at room temperature for about an hour. The mixed solution was heated to 80° C. and then mixed with 50 mL of 28% aqueous ammonia. The mixing was completed within one second by pouring the mixed solution and the aqueous ammonia down into a cup of a high-speed disperser through different tubes and mixing and stirring them by rotational and shearing forces. The cloudy solution resulting from the mixture of aqueous ammonia was allowed to stand for a day and night to produce a cake, and the cake was centrifuged and sufficiently rinsed in water. The water-rinsed cake was dried by heating it at approximately 150° C., and then calcined under the condition of keeping it at 400° C. for five hours and then keeping it at 500° C. for two hours, thereby obtaining a mixed oxide.

The resultant mixed oxide is doped with Rh as a first precious metal catalyst component and has a structure that Rh atoms are placed between atoms, at crystal lattice points and/or at oxygen defect sites of the mixed oxide. Therefore, the mixed oxide of this type is hereinafter referred to as a Rh-doped mixed oxide, as appropriate. The composition of this Rh-doped mixed oxide exclusive of Rh is expressed by $Zr_{0.79}Ce_{0.19}Nd_{0.02}O_2$. The amount of doped Rh in the Rh-doped mixed oxide is 0.486 mass %.

Preparation of Precious Metal-Undoped Mixed Oxide

Respective predetermined amounts of zirconium oxynitrate solution, cerous nitrate solution and neodymium (III) nitrate hydrate solution were mixed with water to make a total volume of 300 mL of mixed solution, and the mixed solution was stirred at room temperature for about an hour. The mixed solution was heated to 80° C. and then mixed with 50 mL of 28% aqueous ammonia. The mixing was completed within one second in the same manner as with the Rh-doped mixed oxide. The resultant cloudy solution was allowed to stand for a day and night to produce a cake, and the cake was centrifuged and sufficiently rinsed in water. The water-rinsed cake was dried by heating it at approximately 150° C., and then calcined under the condition of keeping it at 400° C. for five hours, thereby obtaining a mixed oxide. The precious metal-undoped mixed oxide thus obtained has a composition of $Zr_{0.79}Ce_{0.19}Nd_{0.02}O_2$.

XRD

Figure 3:
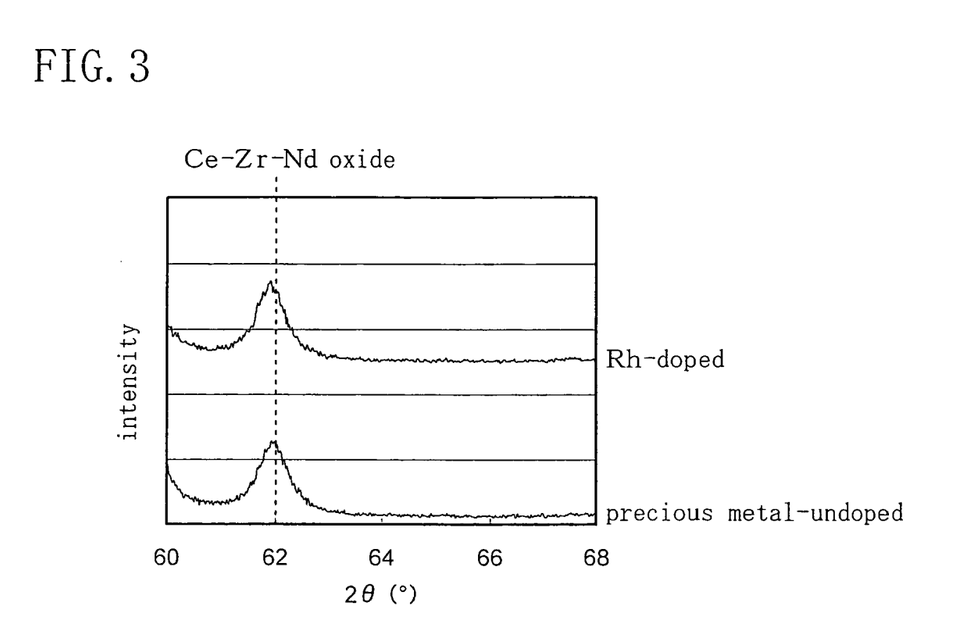
FIG. 3 is a graph showing XRD (X-ray Diffractometry) results of Ce—Zr—Nd oxides in a Rh-doped mixed oxide and a precious metal-undoped mixed oxide which were measured in terms of x-ray diffraction peak intensity.

The Rh-doped mixed oxide and the precious metal-undoped mixed oxide were subjected to aging, i.e., they were kept in a normal atmosphere at 100° C. for 24 hours, and then their Ce—Zr—Nd oxides were measured in terms of x-ray diffraction peak intensity by x-ray diffractometry (XRD). The measurement results are shown in FIG. 3. As can be seen from the figure, the peak intensity of Ce—Zr—Nd oxide for the Rh-doped mixed oxide shifts towards lower angles as compared with that for the precious metal-undoped mixed oxide. This shift towards lower angles is recognized to be the influence of Rh. Therefore, it is believed that Rh atoms exist at crystal lattice points or between atoms of the Ce—Zr—Nd oxide, i.e., the Ce—Zr—Nd oxide is doped with Rh.

Oxygen Storage Property of Rh-Doped Mixed Oxide

A Rh-doped mixed oxide as described above and a Rh-post-loaded mixed oxide were prepared, and they were examined in terms of oxygen storage property. The preparation method for the Rh-post-loaded mixed oxide is as follows.

Preparation of Rh-Post-Loaded Mixed Oxide

First, a precious metal-undoped mixed oxide was prepared according to the method described in "Preparation of precious metal-undoped mixed oxide". Respective predetermined amounts of water and rhodium nitrate solution were added to a predetermined amount of the precious metal-undoped mixed oxide, and the mixture was heated to evaporate the solvent. The resultant mixture was dried and calcined at 500° C. for two hours to make a Rh-post-loaded mixed oxide. The amount of doped Rh in the Rh-post-loaded mixed oxide is 0.486 mass %.

Oxygen Storage Property Evaluation

Each of the Rh-doped mixed oxide and the Rh-post-loaded mixed oxide was mixed with alumina and prepared into a granular sample. Each granular sample was aged (heated at 1000° C. in a normal atmosphere for 24 hours) and then measured in terms of the rate of oxygen storage in an oxygen enriched atmosphere. The amount of each sample measured is 0.05 g, 0.016 g of which is alumina.

Figure 4:
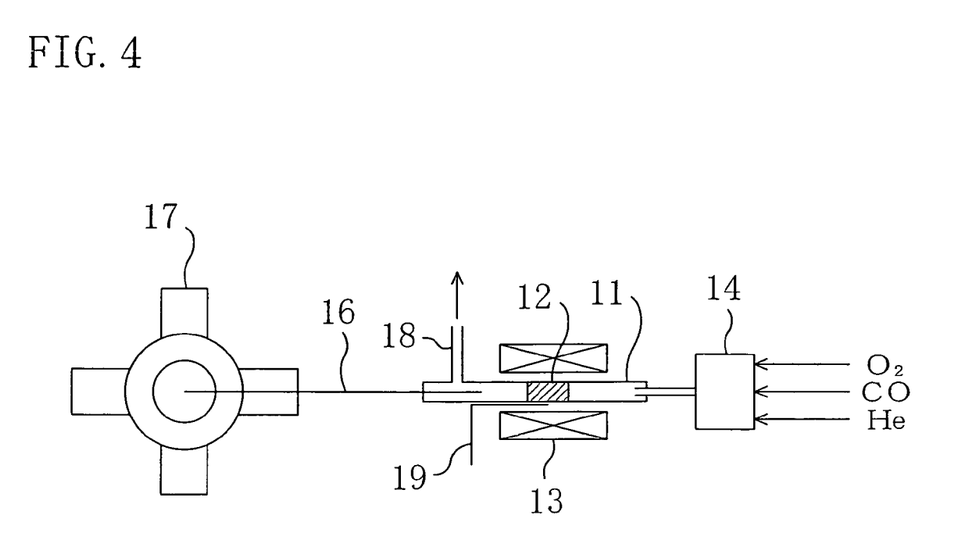
FIG. 4 is a schematic diagram showing a measurement device for measuring the rate of oxygen storage.

FIG. 4 shows a measurement device for measuring the rate of oxygen storage. In this figure, the reference numeral 11 denotes a glass tube for holding a sample (mixed oxide) 12. The sample 12 is kept heated at a predetermined temperature by a heater 13. The glass tube 11 is connected, upstream of the sample 12, with a pulse gas generator 14 for pulsatively supplying gases of $O_2$, CO and He individually. Downstream of the sample 12 in the glass tube 11, the glass tube 11 is connected with a mass spectrometer 17 through a capillary column 16 and provided with an exhaust part 18. A thermocouple 19 for temperature control is attached to the portion of the glass tube 11 in which a sample is to be held.

Figure 5:
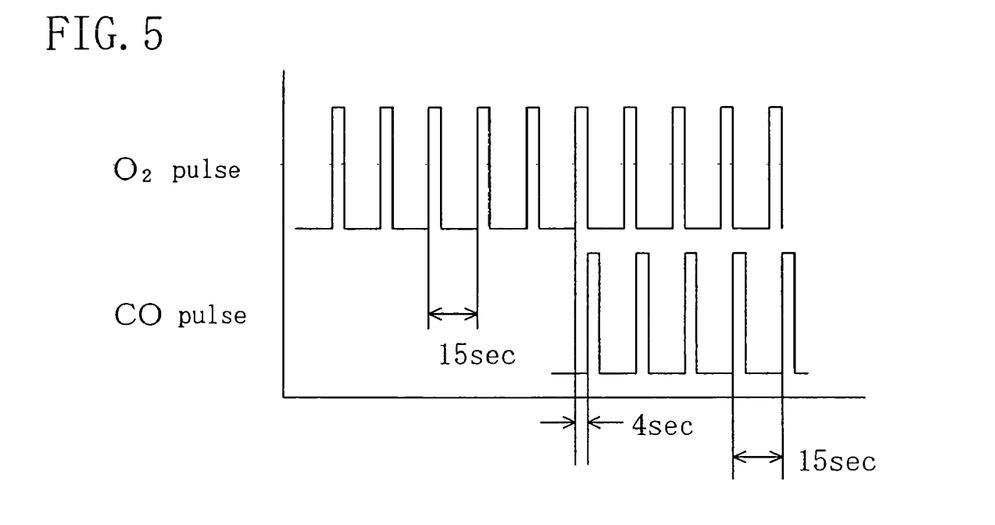
FIG. 5 is a time chart showing how the measurement device generates $O_2$ pulses and CO pulses.

In measurement, the sample temperature in the glass tube 11 was kept at 500° C. Under this condition, as shown in FIG. 5, a cycle of generation of a single $O_2$ pulse (a pulse width of 25 ms) every 15 seconds was repeated several times and CO pulses (a pulse width of 50 ms) were then generated each after a four second delay from each generation of subsequent $O_2$ pulses, while exhaust gas was constantly discharged from the exhaust part 18. During the time, the mass spectrometer 17 was used to measure the time variation of the signal intensity of mass number 32 (the amount of $O_2$) in each cycle.

Figure 6:
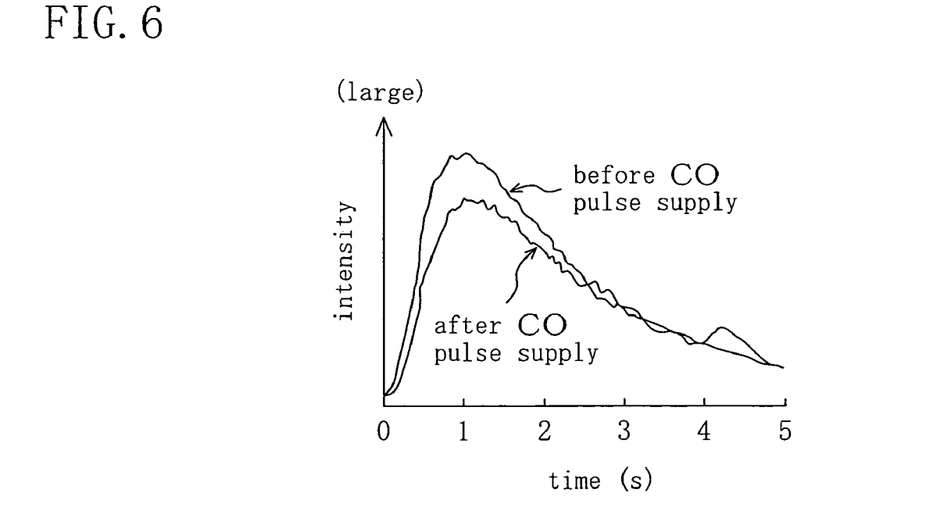
FIG. 6 is a graph showing the time variations of the signal intensity of mass number 32 measured by a mass spectrometer in the measurement device.

Thus, as shown in FIG. 6, there were determined the time variation of the signal intensity of mass number 32 before supply of CO pulses (data when the change in the signal intensity become stable because of saturation of oxygen storage of the sample during the period of generation of $O_2$ pulses alone) and the time variation of the signal intensity of mass number 32 after supply of CO pulses (data when the change in the signal intensity become stable during the period of generation of CO pulses after generation of $O_2$ pulses alone. In this determination results, the reason for the difference between the signal intensities before and after supply of CO pulses is that the sample absorbed oxygen.

More specifically, the signal intensity before supply of CO pulses is based on the observation of amount of oxygen having passed through the sample in which oxygen storage is saturated. Therefore, it almost exactly reflects the amount of oxygen supplied by $O_2$ pulses. On the other hand, after supply of CO pulses, supplied CO pulses allow $O_2$ to be released from inside the sample and thereby changed into $CO_2$, and in turn the corresponding amount of oxygen to the released oxygen is absorbed into the sample. Therefore, the signal intensity after supply of CO pulses reflects the amount of oxygen obtained by subtracting the amount of absorbed oxygen from the amount of oxygen supplied by $O_2$ pulses. Hence, the amount of absorbed oxygen (i.e., the amount of oxygen storage) can be obtained by subtracting the signal intensity after supply of CO pulses from the signal intensity before supply of CO pulses. In practice, the sample releases previously absorbed oxygen while absorbing new oxygen. Therefore, the amount of oxygen storage described herein is an apparent amount of oxygen storage.

Figure 7:
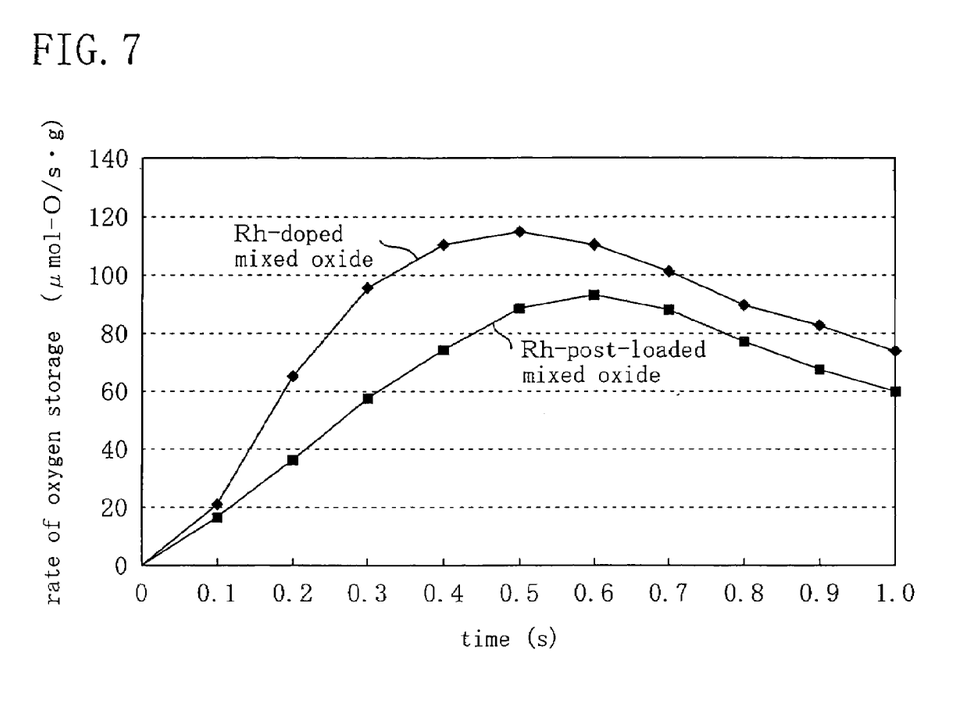
FIG. 7 is a graph showing the time variations of the rates of oxygen storage of a Rh-doped mixed oxide sample and a Rh-post-loaded mixed oxide sample.

FIG. 7 shows the time variations of the rates of oxygen storage (numbers of moles of absorbed oxygen atoms per gram of sample per second) of the Rh-doped mixed oxide sample (mixed with alumina) and the Rh-post-loaded mixed oxide sample (mixed with alumina) determined by the mass spectrometer described above. As can be seen from the figure, for the Rh-doped mixed oxide, the rate of oxygen storage is rapidly raised as compared with the Rh-post-loaded mixed oxide, the peak rate is higher, and the amount of oxygen storage is larger.

Influences of Rate of Mixture of Aqueous Ammonia on Oxygen Storage Property

For the Rh-doped mixed oxide, three types of Rh-doped mixed oxides A, B and C were prepared by changing the rate of mixture of the above-mentioned acidic solution and aqueous ammonia in the precursor preparation step 2, and then examined for oxygen storage property.

More specifically, the Rh-doped mixed oxides A, B and C were prepared by mixing the source material solution with 50 mL of aqueous ammonia at a rate of 50 mL/sec (i.e., over one second from start to finish), at a rate of 0.42 mL/sec (i.e., over two minutes from start to finish) and at a rate of 0.04 mL/sec (i.e., over 20 minutes from start to finish), respectively. The preparation of the Rh-doped mixed oxide A employs a mixing technique using a high-speed disperser, while the preparation of the others employs a technique of dropping aqueous ammonia into the source material solution while stirring the solution.

Then, the Rh-doped mixed oxides A, B and C were aged (heated at 1000° C. in a normal atmosphere for 24 hours)) without the addition of alumina, and then examined for oxygen storage property using the above-mentioned measurement device. The measurement results are shown in FIG. 8.

Figure 8:
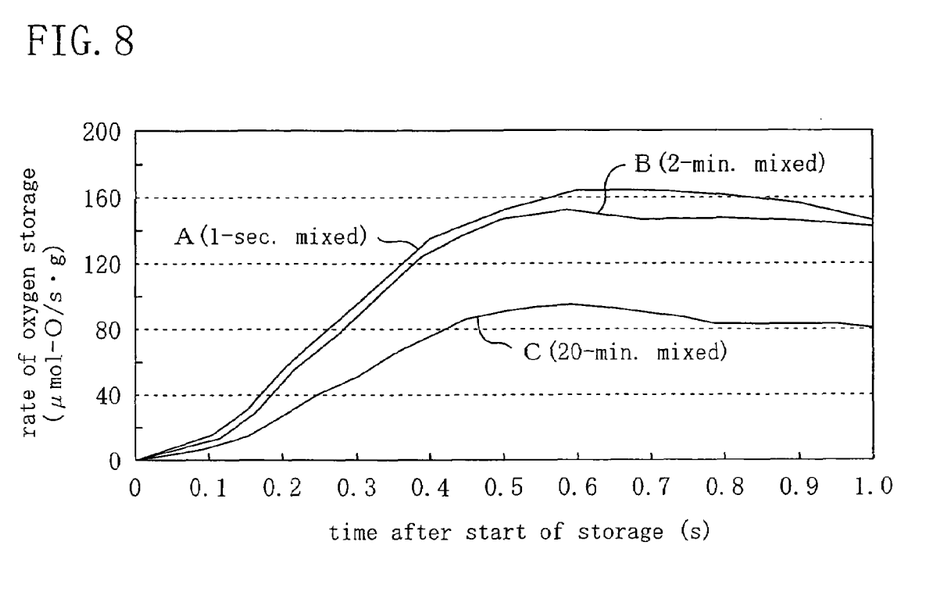
FIG. 8 is a graph showing the time variations of the rates of oxygen storage of Rh-doped mixed oxides A, B and C.

As can be seen from FIG. 8, for the Rh-doped mixed oxides A and B, the rate of oxygen storage from 0.4 seconds to 1.0 second after the start of storage is 120 μmol-O/sec-gram or more, and the peak value of the rate of oxygen storage is 140 μmol-O/sec-gram or more. On the other hand, for the Rh-doped mixed oxide C, the rate of oxygen storage does not reach 100 μmol-O/sec-gram even at the highest, and the rise of the rate of oxygen storage is gentler than those for the mixed oxides A and B.

It turns out from the above that when the rate of mixture between the source material solution and aqueous ammonia is decreased, the Rh dispersivity of the resultant mixed oxide becomes worse so that improvement of oxygen storage property due to Rh cannot be expected.

Specific Surface Area of Mixed Oxide

The Rh-doped mixed oxide A and the Rh-post-loaded mixed oxide were measured in terms of both specific surface areas when fresh and after aged as described above using the BET (Brunauer-Emmer-Teller) method. The measurement results are shown in Table 1.

TABLE 1

| | BET specific surface area (m²/g) | |
|---|---|---|
| | Rh-doped mixed oxide | Rh-post-loaded mixed oxide |
| Fresh | 120 | 105 |
| After aged | 17 | 8.5 |

The Rh-doped mixed oxide has larger specific surface areas both when fresh and after aged than the Rh-post-loaded mixed oxide. In particular, the specific surface area of the Rh-doped mixed oxide after aged is twice as large as that of the Rh-post-loaded mixed oxide after aged, which exhibits high thermal resistance.

Exhaust Gas Conversion Property of Catalytic Material

Preparation of Rh-Loaded Catalytic Material

For a Rh-loaded catalytic material in which the first and second precious metal catalyst components are both Rh and the total amount of loaded Rh is 0.25 mass %, five types of Rh-loaded catalytic materials were prepared which have different Rh-doping rates of 0%, 25%, 50%, 75% and 100%. The doping rate is obtained according to the following formula.

Doping rate=((amount of first precious metal catalyst component)/(amount of first precious metal catalyst component+amount of second precious metal catalyst component))×100

The catalytic material with a Rh-doping rate of 0% is the one prepared by the method previously described in "—Preparation of Rh-post-loaded mixed oxide—". More specifically, a precious metal-unloaded mixed oxide was prepared which has no Rh as the first precious metal catalyst component, and the mixed oxide was then post-loaded with the total amount of loading of Rh of 0.25 mass % by evaporation to dryness (i.e., non-doped).

The catalytic material with a Rh-doping rate of 25% is the one obtained by preparing a mixed oxide doped with Rh as the first precious metal catalyst component by an amount (0.0625 mass %) corresponding to 25% of the total amount of loading of Rh of 0.25 mass % and then post-loading the mixed oxide with Rh by the remaining 75% of the total amount of loading of Rh.

The catalytic material with a Rh-doping rate of 50% is the one obtained by preparing a mixed oxide doped with Rh as the first precious metal catalyst component by an amount (0.125 mass %) corresponding to 50% of the total amount of loading of Rh of 0.25 mass % and then post-loading the mixed oxide with Rh by the remaining 50% of the total amount of loading of Rh.

The catalytic material with a Rh-doping rate of 75% is the one obtained by preparing a mixed oxide doped with Rh as the first precious metal catalyst component by an amount (0.1875 mass %) corresponding to 75% of the total amount of loading of Rh of 0.25 mass % and then post-loading the mixed oxide with Rh by the remaining 25% of the total amount of loading of Rh.

The catalytic material with a Rh-doping rate of 100% is the one obtained by simply preparing a mixed oxide doped with Rh as the first precious metal catalyst component by the total amount of loading of Rh of 0.25 mass % (i.e., non-post-loaded).

The Rh-doped mixed oxide described above was prepared according to the method described in "—Preparation of Rh-doped mixed oxide—", while the Rh post-loading was carried out according to the evaporation-to-dryness method described in "—Preparation of Rh-post-loaded mixed oxide—".

The doping rates of the above catalytic materials or other catalytic materials described later can be calculated easily based on the amount of first precious metal catalyst component used in the step of obtaining a mixed oxide doped with the first precious metal catalyst component and the amount of second precious metal catalyst component used in the step of loading the mixed oxide with the second precious metal catalyst component. However, their doping rates may also be calculated according to the following method even they are catalytic materials after produced.

The doping rate of catalytic materials containing Rh as both first and second precious metal catalyst components can be calculated according to the above-described doping rate formula by obtaining the total amount of the first and second precious metal catalyst components by ICP (Inductively Coupled Plasma) spectrometry well known as a wet chemical analysis technique and obtaining the amount of the second precious metal catalyst component loaded on the mixed oxide surface by XPS (X-ray Photoelectron Spectroscopy) analysis well known as a surface analysis technique. Even for catalytic materials containing different first and second precious metal catalyst components, their doping rate can be calculated likewise.

Preparation of Pt-Loaded Catalytic Material

For a Pt-loaded catalytic material in which the first and second precious metal catalyst components are Rh and Pt, respectively, and the total amount of loaded precious metals Rh and Pt is 0.25 mass %, four types of Pt-loaded catalytic materials of different Rh-doping rates of 0%, 25%, 50% and 75% were prepared in the same manner as with the Rh-loaded catalytic materials.

The catalytic material with a Rh-doping rate of 0% is the one obtained by post-loading a precious metal-unloaded mixed oxide with 0.25 mass % of Pt (i.e., non-doped). The catalytic material with a Rh-doping rate of 25% is the one obtained by preparing a mixed oxide doped with 0.0625 mass % of Rh and then post-loading the mixed oxide with 0.1875 mass % of Pt. The catalytic material with a Rh-doping rate of 50% is the one obtained by preparing a mixed oxide doped with 0.125 mass % of Rh and then post-loading the mixed oxide with 0.125 mass % of Pt. The catalytic material with a Rh-doping rate of 75% is the one obtained by preparing a mixed oxide doped with 0.1875 mass % of Rh and then post-loading the mixed oxide with 0.0625 mass % of Pt.

Preparation of Pd-Loaded Catalytic Material

For a Pd-loaded catalytic material in which the first and second precious metal catalyst components are Rh and Pd, respectively, and the total amount of loaded precious metals Rh and Pd is 0.25 mass %, four types of Pd-loaded catalytic materials of different Rh-doping rates of 0%, 25%, 50% and 75% were prepared in the same manner as with the Rh-loaded catalytic materials.

The catalytic material with a Rh-doping rate of 0% is the one obtained by post-loading a precious metal-unloaded mixed oxide with 0.25 mass % of Pd (i.e., non-doped). The catalytic material with a Rh-doping rate of 25% is the one obtained by preparing a mixed oxide doped with 0.0625 mass % of Rh and then post-loading the mixed oxide with 0.1875 mass % of Pd. The catalytic material with a Rh-doping rate of 50% is the one obtained by preparing a mixed oxide doped with 0.125 mass % of Rh and then post-loading the mixed oxide with 0.125 mass % of Pd. The catalytic material with a Rh-doping rate of 75% is the one obtained by preparing a mixed oxide doped with 0.1875 mass % of Rh and then post-loading the mixed oxide with 0.0625 mass % of Pd.

Catalyst Performance Tests

The above Rh-, Pt- and Pd-loaded catalytic materials were individually mixed with respective predetermined amounts of alumina, zirconyl nitrate and water to prepare slurries. Honeycomb substrates made of cordierite were immersed in and then pulled out of the prepared slurries, respectively. Excess slurries were blown off from the honeycomb substrates, and the substrates were calcined at 500° C. for two hours, thereby obtaining catalyst samples. The catalyst samples were aged by keeping them at 1000° C. in a normal atmosphere for 24 hours.

Each substrate has 25.4 mm diameter, 50 mm length, 400 cells per square inch (approximately 6.54 $cm^2$), and 6 mill (approximately 0.15 mm) inter-cell wall thickness. The amount of loaded precious metal catalyst components per L of substrate in each catalyst is 0.14 g.

After aged in the above manner, each catalyst sample was attached to a model gas flow reactor, allowed to pass a model gas of rich A/F ratio (temperature: 600° C.) for 10 minutes, and then measured in terms of light-off temperatures T50 for conversion of HC, CO and NOx and high-temperature catalytic conversion efficiencies C400 and C500 by an exhaust gas analyzer. T50 indicates the gas temperature at the entrance of each catalyst when the gas conversion efficiency reaches 50% after the temperature of the model gas flowing into the catalyst is gradually increased from normal temperature. C400 indicates the catalytic conversion efficiency when the gas temperature at the catalyst entrance is 400° C. C500 indicates the catalytic conversion efficiency when the gas temperature at the catalyst entrance is 500° C. The model gas had an A/F ratio of 14.7±0.9. Specifically, a mainstream gas was allowed to flow constantly at an A/F ratio of 14.7 and a predetermined amount of gas for changing the A/F ratio was added in pulses at a rate of 1 Hz, so that the A/F ratio was forcedly oscillated within the range of +0.9. The space velocity SV was 60000 $h^{-1}$, and the rate of temperature rise was 30° C./min.

Test Results

Light-Off Performance

Figure 9:
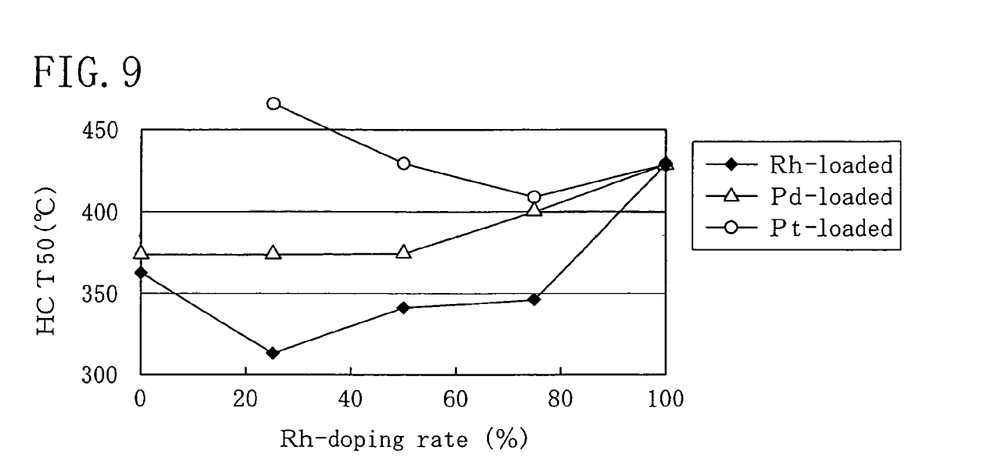
FIG. 9 is a graph showing the relationship between Rh-doping rate and light-off temperature T50 in terms of HC conversion for three types of catalytic materials containing different second precious metal catalyst components.
Figure 10:
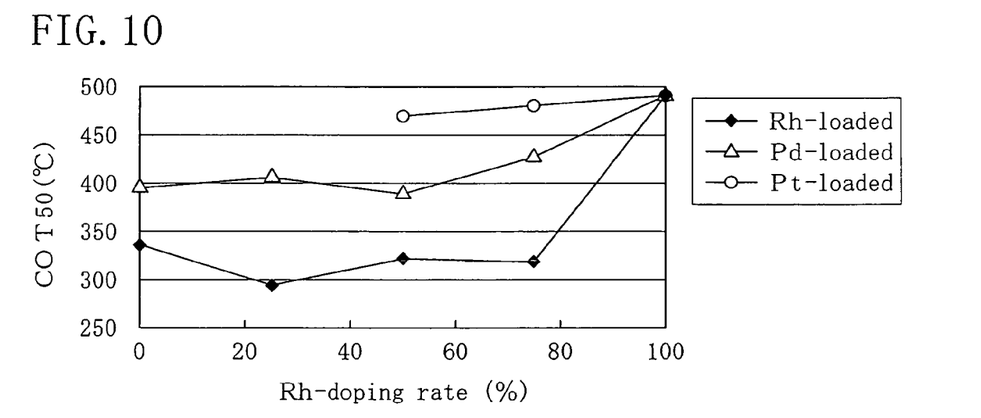
FIG. 10 is a graph showing the relationship between Rh-doping rate and light-off temperature T50 in terms of CO conversion for three types of catalytic materials containing different second precious metal catalyst components.
Figure 11:
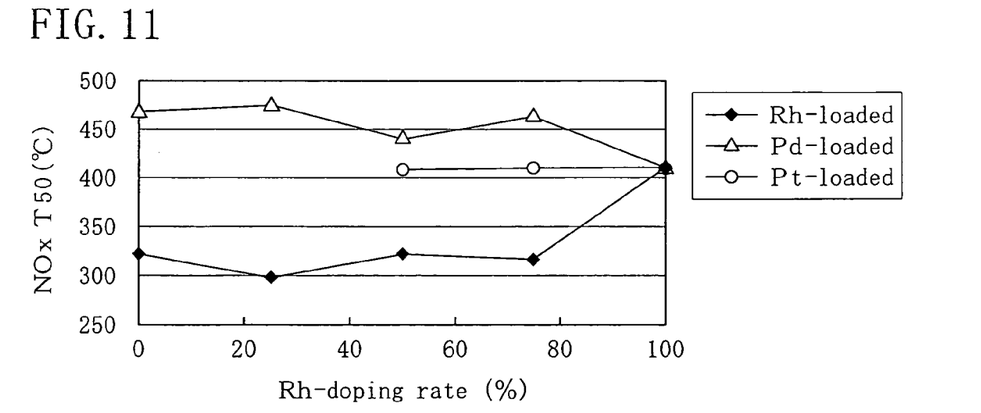
FIG. 11 is a graph showing the relationship between Rh-doping rate and light-off temperature T50 in terms of NOx conversion for three types of catalytic materials containing different second precious metal catalyst components.

The results from T50 tests for conversion of HC, CO and NOx are shown in FIGS. 9, 10 and 11, respectively. In these figures, "Rh-loaded", "Pt-loaded" and "Pd-loaded" indicate "Rh-loaded catalytic material", "Pt-loaded catalytic material" and "Pd-loaded catalytic material", respectively. The same applies to FIGS. 12 to 17.

Focusing first on "Rh-loaded", T50 values for HC, CO and NOx are lower at Rh-doping rates of 25%, 50% and 75% than at 0% (Rh-post-loaded only) and 100% (non-Rh-post-loaded).

Particularly, in respect of HC and CO, the catalytic materials with Rh-doping rates of 25%, 50% and 75% have high light-off performance, though they have smaller amount of Rh loaded on the mixed oxide surface than the catalytic material with a Rh-doping rate of 0% (Rh-post-loaded only). The reason for this is believed to be that doped Rh improved the oxygen storage/release capacity of the catalytic material (mixed oxide) and therefore the activity of Rh post-loaded was also improved.

Referring next to "Pt-loaded", at a Rh-doping rate of 0%, T50 values for HC and CO are 500° C. or more but T50 value for NOx could not be determined. At a Rh-doping rate of 25%, T50 value for HC is 467° C., T50 value for CO is 500° C. or more but T50 value for NOx could not be determined. At high Rh-doping rates of 50% and 75%, T50 values for HC, CO and NOx are dropped down to below 500° C. or below 450° C., and are substantially on the same level as those at a Rh-doping rate of 100% (non-Pt-post-loaded).

Therefore, in terms of "Pt-loaded", it can be said that the light-off performance can be improved by increasing the Rh-doping rate.

Finally, referring to "Pd-loaded", T50 values for HC and CO are lower at Rh-doping rates of 25%, 50% and 75% than at 100% (non-Pd-post-loaded). Further, when T50 values for each of HC, CO and NOx at Rh-doping rates of 25% and 50% are compared with that at a Rh-doping rate of 0% (Pd-post-loaded only), the formers are substantially on the same level as or slightly lower than the latter. Considering that the formers have smaller amount of Rh loaded on the mixed oxide surface than the latter, it can be said that the doped Rh effectively acts for improvement in light-off performance. Particularly, at a Rh-doping rate of 50%, the light-off performances for CO and NOx are improved.

High-Temperature Catalytic Conversion Performance

Figure 12:
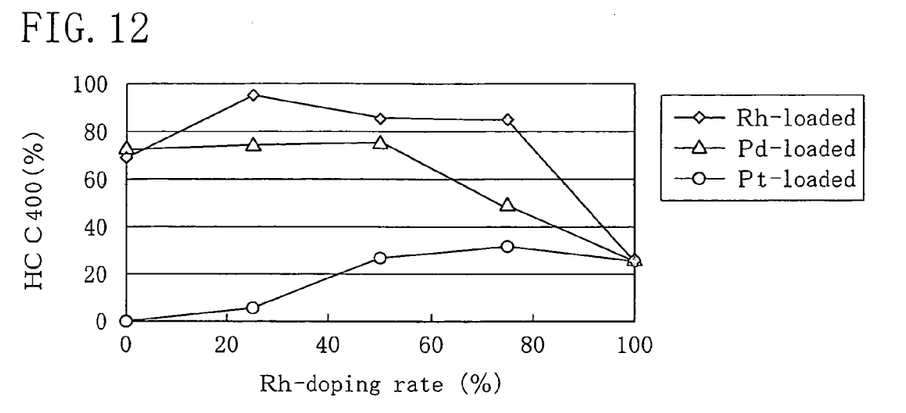
FIG. 12 is a graph showing the relationship between Rh-doping rate and high-temperature catalytic conversion efficiency C400 of HC for three types of catalytic materials containing different second precious metal catalyst components.
Figure 13:
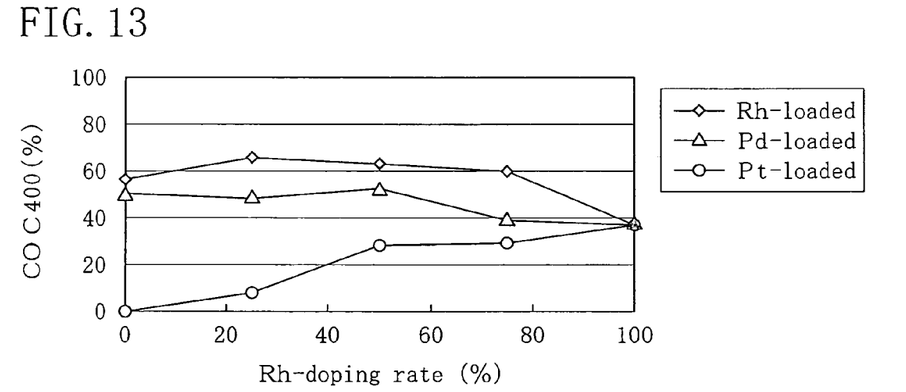
FIG. 13 is a graph showing the relationship between Rh-doping rate and high-temperature catalytic conversion efficiency C400 of CO for three types of catalytic materials containing different second precious metal catalyst components.
Figure 14:
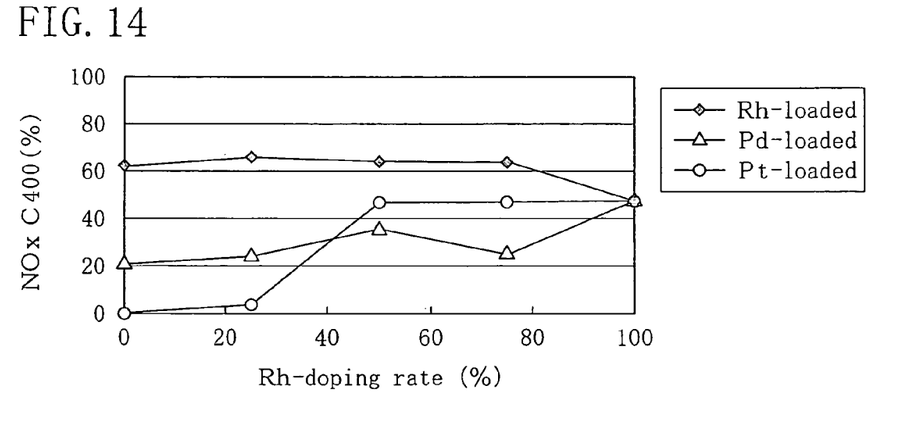
FIG. 14 is a graph showing the relationship between Rh-doping rate and high-temperature catalytic conversion efficiency C400 of NOx for three types of catalytic materials containing different second precious metal catalyst components.
Figure 15:
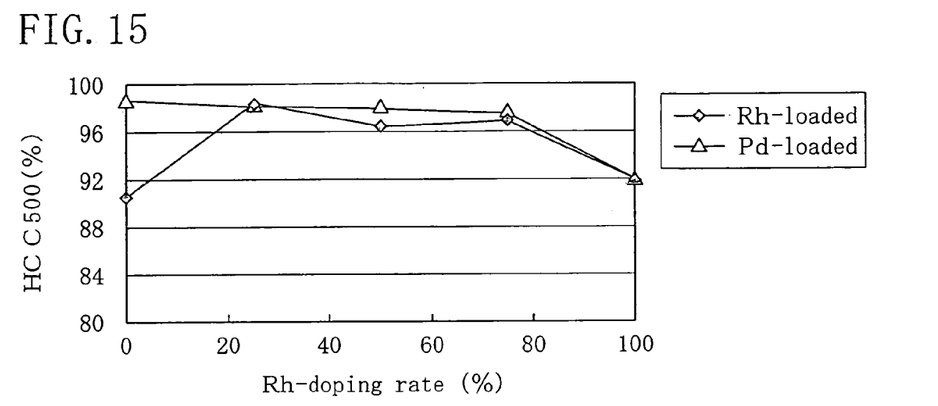
FIG. 15 is a graph showing the relationship between Rh-doping rate and high-temperature catalytic conversion efficiency C500 of HC for three types of catalytic materials containing different second precious metal catalyst components.
Figure 16:
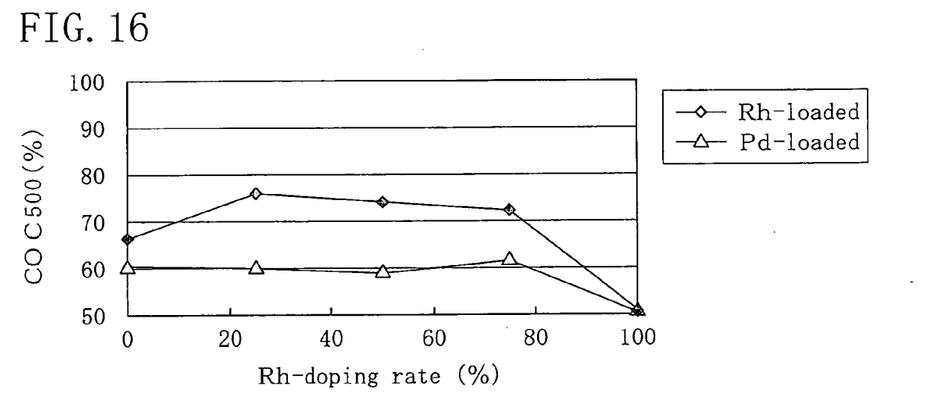
FIG. 16 is a graph showing the relationship between Rh-doping rate and high-temperature catalytic conversion efficiency C500 of CO for three types of catalytic materials containing different second precious metal catalyst components.
Figure 17:
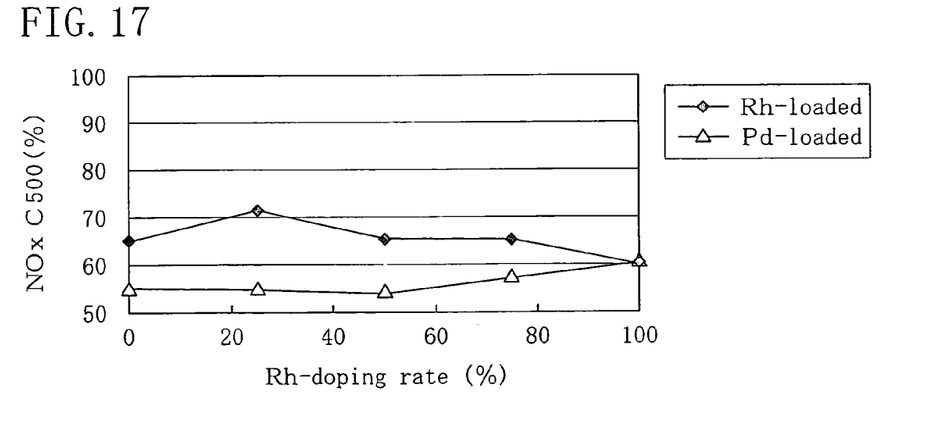
FIG. 17 is a graph showing the relationship between Rh-doping rate and high-temperature catalytic conversion efficiency C500 of NOx for three types of catalytic materials containing different second precious metal catalyst components.

The results from C400 tests for conversion of HC, CO and NOx are shown in FIGS. 12, 13 and 14, respectively. Likewise, the results from C500 tests for conversion of HC, CO and NOx are shown in FIGS. 15, 16 and 17, respectively.

Focusing first on "Rh-loaded", C400 and C500 tests for HC, CO and NOx exhibit better results at Rh-doping rates of 25%, 50% and 75% than at 0% (Rh-post-loaded only) and 100% (non-Rh-post-loaded). The reason for this is believed to be that doped Rh improved the oxygen storage/release capacity of the catalytic material (mixed oxide) and therefore the activity of Rh post-loaded was also improved.

Referring next to "Pt-loaded", C400 tests for HC, CO and NOx exhibit better results at Rh-doping rates of 25%, 50% and 75% than at 0% (Pt-post-loaded only). The trend is noticeable at Rh-doping rates of 50% and 75%. Therefore, it can be said that the effect of Rh doping is apparent.

Finally, referring to "Pd-loaded", high-temperature catalytic conversion efficiencies for HC and CO are higher at Rh-doping rates of 25%, 50% and 75% than at 100% (non-Pd-post-loaded), but substantially on the same level as those at 0% (Pd-post-loaded only).

From the above test results, it can be said that the light-off performance and high-temperature catalytic conversion performance can be improved at Rh-doping rates of 10% to 80%, and more effectively improved at Rh-doping rates of 25% to 75%. Furthermore, it can be said that a remarkable effect can be achieved when the first and second precious metal catalyst components are both Rh.

When the first and second precious metal catalyst components are Rh and Pt, respectively, the Rh-doping rate is preferably 40% to 80%, more preferably 50% to 75%.

When the first and second precious metal catalyst components are Rh and Pd, respectively, the Rh-doping rate is preferably 25% to 75%, more preferably about 50%.

The mixing of an acidic solution with aqueous ammonia can be completed within 0.5 seconds or within 0.4 seconds, and therefore a good catalytic material can be obtained.

What is claimed is:

1. An exhaust gas purification catalytic material containing:

(a) a CeZr based mixed oxide of a nonperovskite type, the mixed oxide containing Ce and Zr for storing and releasing oxygen; and (b) a precious metal catalyst made of one or more kinds of precious metals, wherein the precious metal catalyst comprises a first precious metal catalyst component placed between atoms, at crystal lattice points and/or at oxygen defect sites of the mixed oxide and a second precious metal catalyst component loaded on the surface of the mixed oxide; and the amount of the first precious metal catalyst component is 10 mass % to 80 mass % both inclusive of the total amount of the first and second precious metal catalyst components.

2. The exhaust gas purification catalytic material of claim 1, wherein the first precious metal catalyst component is Rh.

3. The exhaust gas purification catalytic material of claim 1, wherein the second precious metal catalyst component comprises at least one of Rh, Pt and Pd.

4. The exhaust gas purification catalytic material of claim 1 wherein the CeZr based mixed oxide further contains Nd.

5. An exhaust gas purification catalytic material containing:

(a) a CeZr based mixed oxide of a nonperovskite type, the mixed oxide containing Ce and Zr for storing and releasing oxygen; and (b) a precious metal catalyst made of one or more kinds of precious metals, wherein the precious metal catalyst comprises a first precious metal catalyst component placed between atoms, at crystal lattice points and/or at oxygen defect sites of the mixed oxide and a second precious metal catalyst component loaded on the surface of the mixed oxide, the first precious metal catalyst component is Rh, the second precious metal catalyst component comprises at least one of Rh, Pt, and Pd, the amount of the first precious metal catalyst component is 10 mass % to 80 mass % both inclusive of the total amount of the first and second precious metal catalyst components.

6. The exhaust gas purification catalytic material of claim 5 wherein the CeZr based mixed oxide further contains Nd.

* * * * *